(12) United States Patent
Norberg et al.

(10) Patent No.: US 8,313,684 B1
(45) Date of Patent: Nov. 20, 2012

(54) METHOD OF AND DEVICE FOR THERMOFORMING OF ANTENNAS

(75) Inventors: Hans Norberg, Monsteras (SE); Torkel Danielsson, Nybro (SE)

(73) Assignee: Flextronics, Broomfield, CO (US)

( * ) Notice: Subject to any disclaimer, the term of this patent is extended or adjusted under 35 U.S.C. 154(b) by 247 days.

(21) Appl. No.: 12/316,489

(22) Filed: Dec. 12, 2008
(Under 37 CFR 1.47)

Related U.S. Application Data

(60) Provisional application No. 61/007,806, filed on Dec. 14, 2007.

(51) Int. Cl.
*B29C 51/00* (2006.01)
(52) U.S. Cl. .......................... 264/320; 264/319; 264/175
(58) Field of Classification Search ........................ None
See application file for complete search history.

(56) References Cited

U.S. PATENT DOCUMENTS

| | | | | |
|---|---|---|---|---|
| 4,210,404 | A * | 7/1980 | Hanger | 400/124.04 |
| 5,151,233 | A * | 9/1992 | Wendt | 264/153 |
| 5,764,190 | A | 6/1998 | Murch et al. | 343/702 |
| 6,140,966 | A | 10/2000 | Pankinaho | 343/700 |
| 6,624,432 | B1 * | 9/2003 | Gabower et al. | 250/515.1 |
| 6,680,705 | B2 | 1/2004 | Tan et al. | 343/702 |
| 6,693,594 | B2 | 2/2004 | Pankinaho et al. | 343/700 |
| 6,792,246 | B2 | 9/2004 | Takeda et al. | 455/41.1 |
| 6,816,076 | B2 * | 11/2004 | Pomes | 340/572.1 |
| 7,026,996 | B2 | 4/2006 | Harano | 343/700 |
| 7,026,999 | B2 | 4/2006 | Umehara et al. | 343/702 |
| 7,119,743 | B2 | 10/2006 | Iguchi et al. | 343/700 |
| 7,319,432 | B2 | 1/2008 | Andersson | 343/702 |
| 2002/0102946 | A1 | 8/2002 | SanGiovanni | 455/90 |
| 2005/0007283 | A1 | 1/2005 | Jo et al. | 343/702 |
| 2005/0195124 | A1 | 9/2005 | Puente Baliarda et al. | 343/893 |
| 2007/0139280 | A1 | 6/2007 | Vance | 343/702 |
| 2009/0229108 | A1 * | 9/2009 | Shamblin et al. | 29/600 |

FOREIGN PATENT DOCUMENTS

| | | |
|---|---|---|
| CN | 1324012 A | 11/2001 |
| EP | 1 018 779 B1 | 7/2000 |
| EP | 1 108 616 A2 | 6/2001 |
| WO | WO 01/82412 A2 | 1/2001 |

* cited by examiner

*Primary Examiner* — Monica A Huson
(74) *Attorney, Agent, or Firm* — Haverstock & Owens LLP

(57) ABSTRACT

A method thermoforms one or more shaped bodies from a thermoformable tape and a structure having a thermoformable tape with one or more shaped bodies. The thermoformable tape is positioned proximate to a thermoforming device and to thermoform the tape with one or more shaped bodies. The structure includes of a thermoformable tape with one or more shaped bodies formed within the tape. The tape can have a plurality of apertures along the edge of the tape configured to impart a positioning force. The thermoformed shaped bodies can be comprised of one or more antenna carriers. The shaped bodies can further include components such as an antenna radiator coupled to the antenna carrier.

11 Claims, 4 Drawing Sheets

METHOD OF AND DEVICE FOR THERMOFORMING OF ANTENNAS

RELATED APPLICATIONS

This application is a utility patent application which claims priority under 35 U.S.C. §119(e) of the co-pending, co-owned U.S. Provisional Patent Application Ser. No. 61/007,806 filed Dec. 14, 2007, and entitled "TAPE & REEL CONCEPT FOR THERMOFORMING ANTENNAS" and is hereby incorporated by reference in its entirety.

BACKGROUND OF THE INVENTION

The application is related to methods of and a devices for thermoforming structures. More specifically, the invention relates to a method of thermoforming shaped structures into a thermoformable tape including shaped bodies used as antenna carriers.

SUMMARY OF THE INVENTION

In a first aspect of the invention, a method of thermoforming one or more structures in a tape is disclosed. The method comprises three steps. In a first step, an area of the thermoformable tape is positioned proximate to a thermoforming device such that the thermoforming device can shape, mold, or press a shaped body into the tape. In a second step, the area of the tape is thermoformed into one or more shaped bodies formed out of an area of the thermoformable tape. The thermoforming can be implemented through heat, pressure, or a combination thereof to thermoform the tape into the desired shaped body.

In one embodiment, the tape is positioned by a mechanical means. The positioning force can be coupled to the tape through a plurality of apertures that are positioned substantially uniformly along each edge of the tape. These apertures can be formed in a round, square, or any other functional shape.

In another embodiment, the method of thermoforming one or more structures into a tape the tape. Such configuring can include but is not limited to scoring or partially perforating the thermoforming material at or near the boundary between the tape and the one or more thermoformed shaped bodies.

In a further embodiment, the method of thermoforming further includes the step of removing one or more shaped bodies from the tape. The removal means can be performed by a mechanical technique that imparts an opposing force between the shaped body and opposing the surrounding tape areas. Also, contemplated by the invention is a removing means including but not limited to a cutting instrument or a heat producing means such as but not limited to a laser, hot wire, or a combination thereof.

In another embodiment of the invention, the method further comprises the step of coupling a component to the one or more thermoformed shaped bodies. The component can comprise a mechanical component including a mechanical subassembly. Further, the component can comprise an electrical component such as but not limited to an individual electronic device, an electronic subassembly, or a conductor.

In another embodiment of the invention, the shaped bodies are one or more antenna carriers formed from the thermoformable tape.

In a further embodiment, the method of forming one or more antenna carriers on a thermoformable tape further comprises the step of coupling an antenna radiator to the antenna carrier. An antenna carrier provides a support structure for the antenna radiator. The antenna radiator can include but is not limited to a conductor coupled to the one or more antenna carriers or a conductive coating applied to a portion of the one or more antenna carriers.

In another embodiment, the method of thermoforming one or more shaped bodies from a thermoformable tape includes the step of spooling the tape of one or more thermoformed shaped bodies on a reel. This provides a spool of thermoformed shaped bodies such as antenna carriers that later can be utilized in other manufacturing processes such as pick and place manufacturing or in further processing of the thermoformed shaped bodies.

In a further embodiment of the invention, the method further comprises the step of incorporating the thermoformed tape of shaped bodies into a continuous manufacturing assembly process. The manufacturing assembly process can include further processing of the thermoformed shaped bodies or can utilize the tape in an assembly line where the shaped bodies are separated from the tape and integrated with other assemblies.

In a second aspect of the invention, the invention discloses one or more shaped bodies thermoformed into a tape of thermoformable material. The structure comprises a tape of thermoformable material that has one or more shaped bodies formed into the tape material. The shaped bodies can be formed into the tape of thermoformable material by a process including but not limited to heat, pressure, or a combination thereof.

In yet a further embodiment of the thermoformed structure, the one or more thermoformed shaped bodies are antenna carriers. In a further embodiment, the structure further comprises one or more antenna radiators coupled to the one or more antenna carriers. The antenna radiators can comprise but is not limited to a separate conductor coupled to a shaped body or a conductor formed on the antenna carrier.

In one embodiment of the thermoformed structure, the tape is configured with a plurality of substantially evenly spaced apertures along at least one edge of the tape. These apertures are configured such that a mechanical positioning force can be imparted to the tape.

In another embodiment of the thermoformed structure, the shaped bodies are configured to be removable from the tape. The configuration of the structure can include but not limited to scoring or partially cutting the interface between the tape and the one or more shaped bodies.

In another embodiment of the thermoformed structure, the structure further comprises a component coupled to at least one of the shaped bodies. The component can comprise but is not limited to a mechanical device, mechanical subassembly, an electronic subassembly, an individual electronic component, or a conductive trace formed on the shaped bodies. In a further embodiment of the tape of thermoformable structures, the tape is configured for spooling around a reel.

BRIEF DESCRIPTION OF THE DRAWINGS

The invention is better understood by reading the following detailed description of exemplary embodiments in conjunction with the accompanying drawings.

DETAILED DESCRIPTION OF THE INVENTION

The following description of the invention is provided as an enabling teaching of the invention which includes the best, currently known embodiment. One skilled in the relevant art will recognize that many changes can be made to the embodiment described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptions to the present inventions are possible and can even be desirable in certain circumstances, and are a part of the present invention. Thus, the following description is provided as illustrative of the principles of the present invention and not in limitation thereof, since the scope of the present invention is defined by the claims.

A tape of thermoformed shaped bodies provides advantages over the current state of the art thermoforming individual sheets of thermoformable material. First, a large number thermoformed shaped bodies can be formed in an automated process. This method is more efficient that than handling individual thermoformable sheets. Secondly, a tape of thermoformed shaped bodies can be spooled onto a reel for later use in an automated manufacture processes such as pick and place assembly lines.

Figure 1:
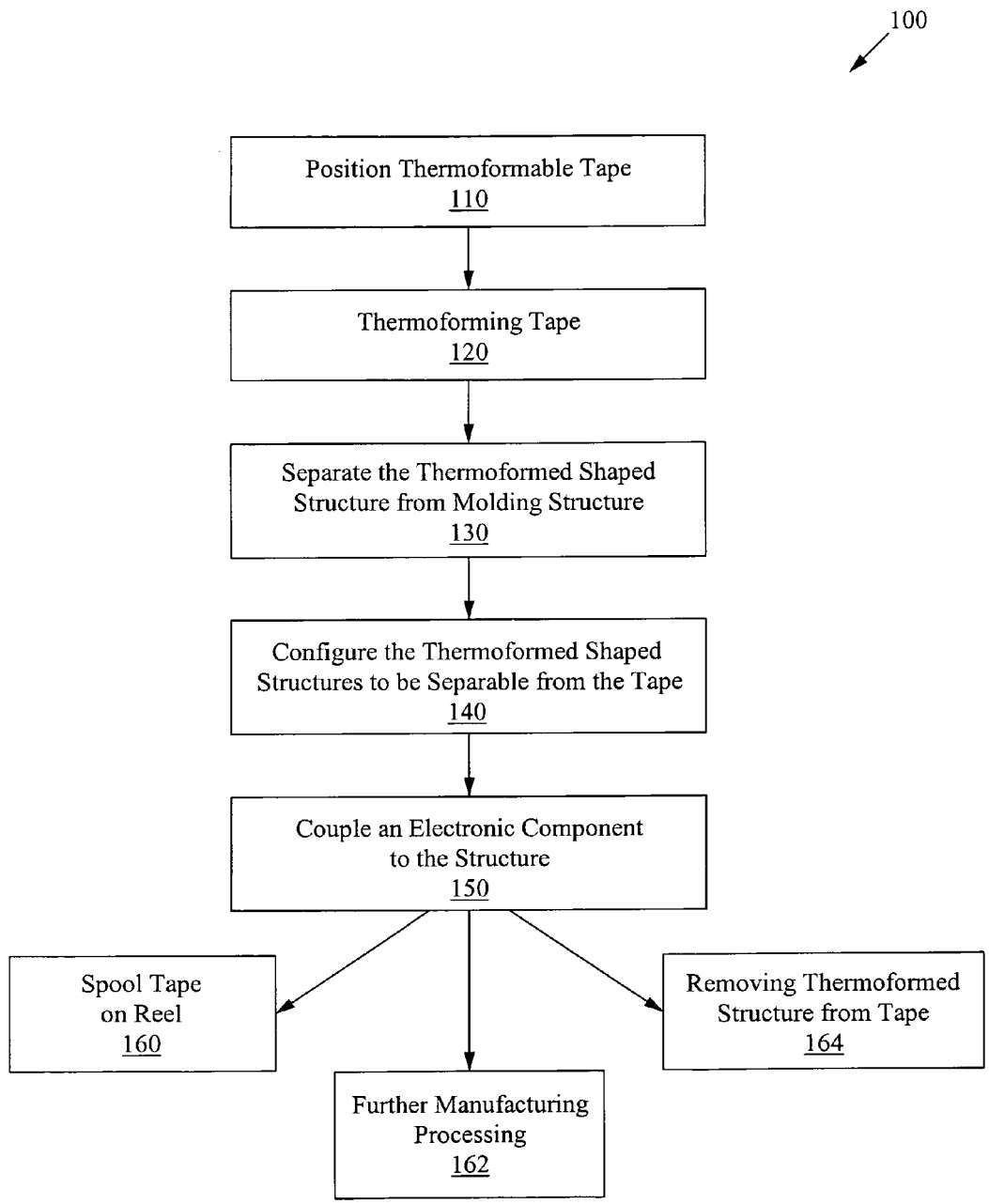
FIG. 1 illustrates a flow chart of the method of thermoforming a tape structure forming one or more shaped bodies.

FIG. 1 illustrates the inventive steps for the method of forming a thermoformed tape with one or more thermoformed shaped bodies. The method begins at step 110. At the step 110, a thermoformable tape is positioned within a means for thermoforming. The positioning of the tape can be performed by any appropriate means including but not limited to mechanical, magnetic, pneumatic, hydraulic, or gravitational forces. The tape is positioned such that the thermoforming means can thermoform one or more shaped bodies into the tape. Preferably the tape has a plurality of apertures along each side of the tape such that a gear or cog fits within the apertures and can impart a positioning force to the tape.

In the step 120, one or more shaped bodies are thermoformed into the tape. The thermoforming is preferably performed by a thermoforming device. The shaped bodies preferably remain coupled to the tape after forming. The thermoforming device applies heat, pressure, or a combination thereof in conjunction with a mold to form one or more shaped bodies. The forming of the tape to the mold can be implemented with pressure from a mold press, pneumatic pressure, a vacuum, or with a combination thereof. The heating can be provided by conduction through a heated mold, radiant heat, or the thermoformable material can be preheated before being subjected to a molding pressure. The molding process can form one or several shaped bodies. The shaped bodies can be substantially the same or differing shapes. The shaped bodies can be used as subassemblies for the production of other assemblies. One exemplary example of these shaped structures is for antenna carriers. These antenna carriers can be used in cell phone, GPS devices, or other electronic devices requiring a receiving and/or transmission antenna.

In the step 130, the tape with the one or more shaped bodies is removed from the means for thermoforming. Preferably, the tape is repositioned such that a new tape area can be thermoformed. The removal of the tape from the thermoforming device can be performed using but not limited to a mechanical device, pneumatic pressure, or any other suitable means.

In the optional step 140, the thermoformed shaped bodies are configured to be readily removed from the tape. This process can include but is not limited to the scoring of the tape at a boundary between the shaped body and the tape. Another method that can be used alone or in combination with scoring is to cut one or more slits along the boundary between the shaped bodies and the tape. This step can occur concurrently with thermoforming of the tape 120.

In the optional step 150, a component is coupled to the thermoformed structure. The component can be comprised of another mechanical structure or an electronic component. The electronic component can comprise, but is not limited to: a conductors such as an antenna radiator, a conductive trace, a wire or connector; passive devices such as a resistor, a capacitor, or an inductor; or active devices such as a transistor, amplifier, integrated circuit, or a combination thereof. The electronic component can be coupled concurrently with thermoforming the shaped body or after the thermoformed shaped body is removed from the thermoforming device. The coupling of the electronic component can be made part of an assembly line process where the thermoformed tape is fed into a processing device for attaching the electronic component. Also, the component can be coupled before thermoforming the shaped body into the thermoformable tape. For example, an area of the tape 210 to be formed into an antenna carrier can be coated with a conductive coating before thermoforming an area of the tape 210 into an antenna carrier, thereby providing an antenna radiator or a conductive trace.

In an optional step 160, the tape with one or more thermoformed shaped bodies is spooled onto a reel. The reel of shaped bodies can then be moved to or shipped to another manufacturing line for further processing or integration into another assembly.

In the optional step 164, the one or more thermoformed structures are removed from the tape. This removal step can be performed by mechanical force where the thermoformed shaped body is configured for removal from the tape by scoring or partial cutting. The removal force can be provided by a mechanical device, pressurized air, a vacuum or similar means. Additionally, the shaped body can be removed by a cutting device including a thermal laser or mechanical cutting device.

In the optional step 162, the tape with the thermoformed shaped bodies is positioned in another manufacturing process device where the shaped bodies are further processed. This processing can include but is not limited to applying coatings to the shaped body, bonding other components to the shaped bodies, cutting apertures into the shaped body, integrating one or more shaped bodies into another assembly, and any combination thereof.

Figure 2:
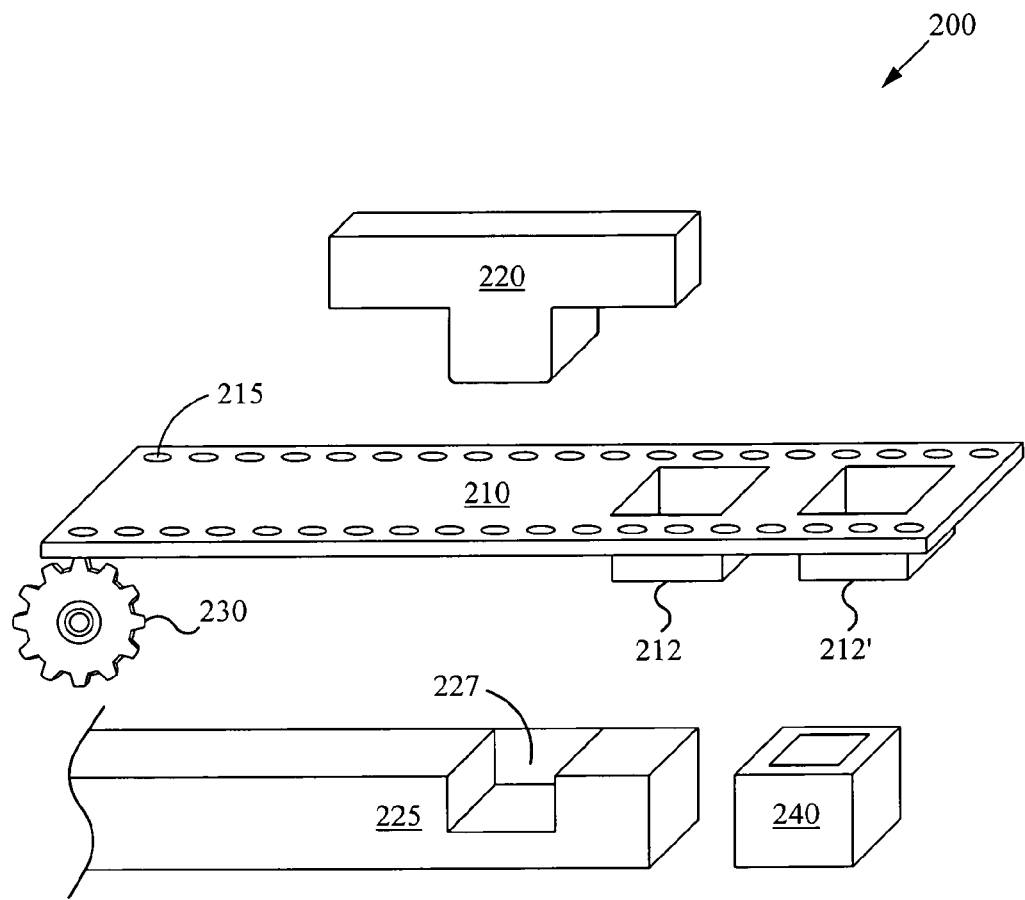
FIG. 2 illustrates the manufacturing of a thermoformable tape structure with a thermoforming device and thereby forming one or more shaped bodies in the tape.

FIG. 2 is an exemplar of a thermoforming system 200 with a thermoformable tape 210 being processed by a thermoforming apparatus 220, 225 and thereby producing a series of thermoformed shaped bodies 212 as the tape 210 is positioned and processed. Additionally, further processing of the shaped bodies 212 is shown by additional processing equipment 240. Preferably, the tape 210 is positioned by the use of a gear or cog 230 which engages the apertures 215 along the edge of the tape 210 and thereby inducing a positioning force. While the positioning of the tape 210 is shown using a single gear 230, more than one gear 230 can be used. Further, other means of positioning the thermoformable tape 210 are contemplated. These positioning means include but are not limited to friction devices, devices using pneumatic pressure, hydraulic pressure, gravitational force, and or a combination thereof. The press 220 and mold 225 can utilize heat, pressure, or a combination thereof to cause the thermoformable tape 210 to conform with the mold cavity 227 and thereby producing one or more shaped bodies 212. The heat can be conducted from the thermoforming apparatus 220, 225, be provided from a radiant source, preheating the tape, or a combination thereof. Resulting from the operation of the thermoforming system is a tape 210 with a plurality of shape bodies 212 formed from the tape 210. These shaped bodies 212, can form subassemblies such as but not limited to an antenna carrier. Processing subsequent to thermoforming can be performed on the shaped bodies 212 while still attached to the tape 210. A further processing element illustrates a device 240 that further processes the shaped body 212 while attached to the thermoformable tape 210. The processing can include but is not limited to attaching or forming an antenna radiator (not shown) on a shaped body 212 that is formed to be an antenna carrier, coupling passive or active electrical components (not shown), coupling connectors, and coupling other structures to the shaped body 212 thereby forming a modified shaped body 212'.

Figure 3:
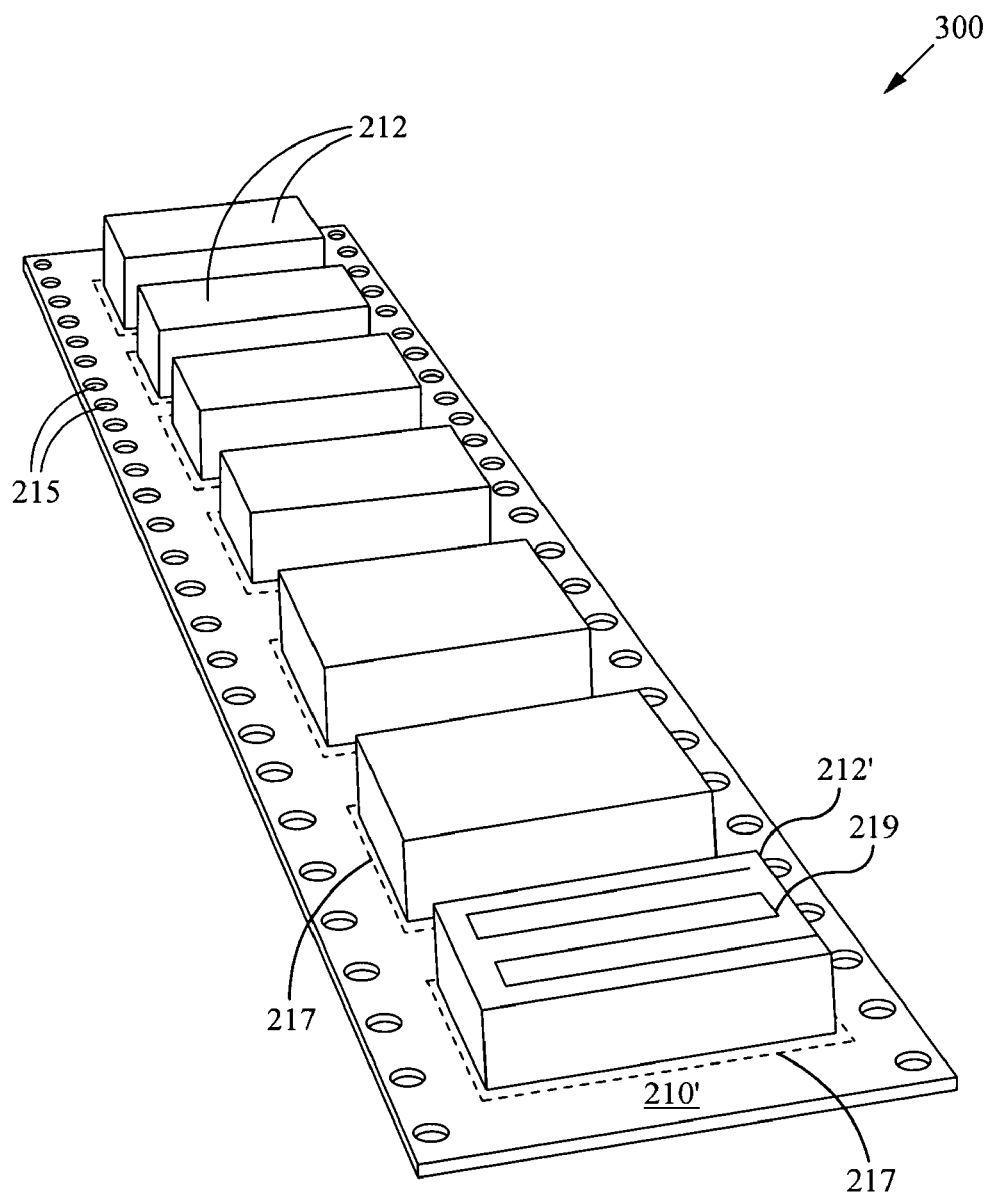
FIG. 3 illustrates the tape structure with multiple shaped bodies formed from the tape.

FIG. 3 is exemplary of a thermoformable tape 210' after being thermoformed with a plurality of shaped bodies 212 on the tape 210'. While it is depicted that the shaped bodies 212 have the substantially the same shape, it is contemplated that the tape can have different shape bodies (not shown) for different end application structures. Further the shaped bodies 212' can have a component 219 coupled to the shaped body 212'. The component 219 can be a conductive trace. Once, the tape is thermoformed the component 219 can act as an antenna such as in a radio or cell phone. The tape 210' is illustrated to have a plurality of apertures 215 along the edge of the tape 210' for a mechanical device such as a cog or gear to impart a force for positioning, moving, and processing the tape 210'. Preferably, the apertures 215 are positioned, spaced, and sized to work with pick and place manufacturing equipment. Preferably, the apertures 215 are round. On the tape 210 is a boundary 217 between the shaped body 212 and the tape 210. This boundary 217 can be configured to facilitate the removal of the shaped body 212 from the tape 210'. This configuration can be implemented by scoring the boundary 217, through a series of partial cuts along the boundary 217, or a combination thereof.

Figure 4:
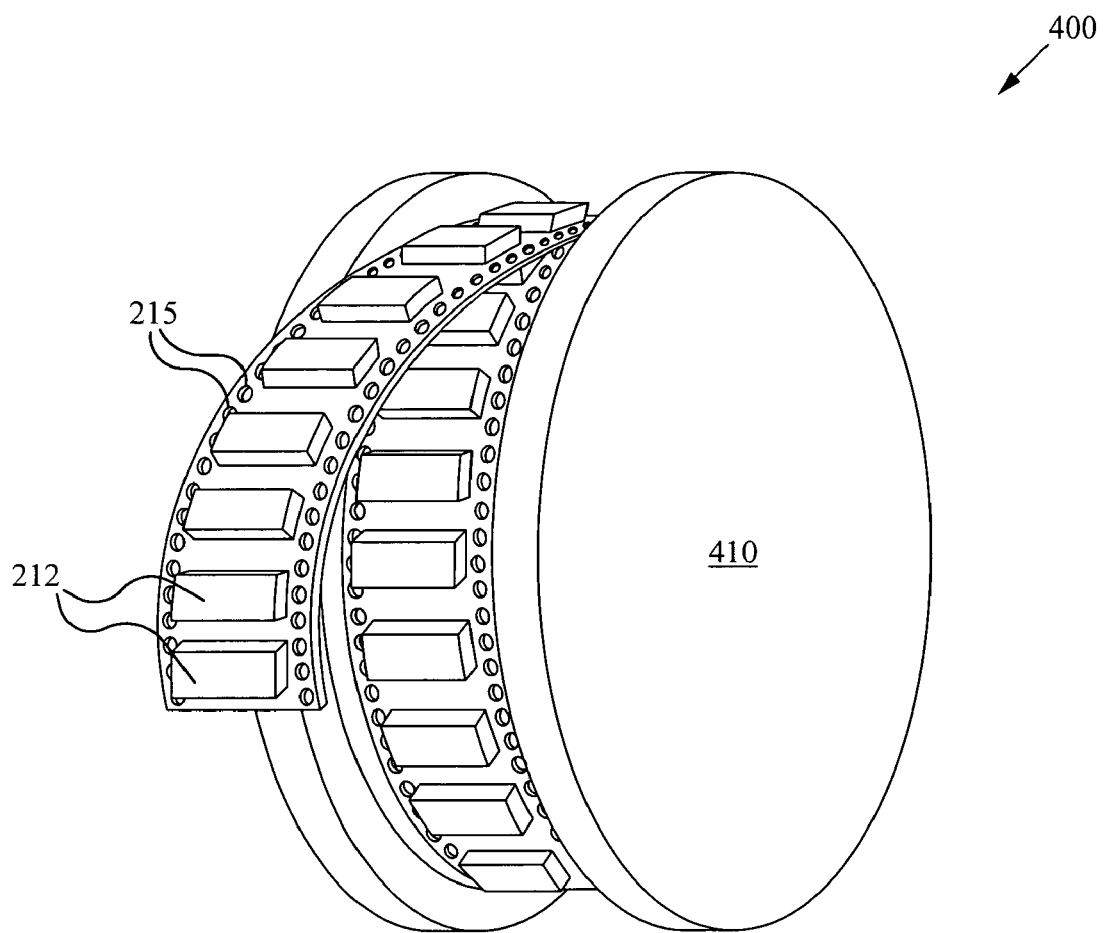
FIG. 4 illustrates the tape structure with multiple shaped bodies spooled on a reel.

FIG. 4 is exemplary of a thermoformable tape 210' with a plurality of thermoformed shaped structures 212 formed on the tape 210'. The tape 210 is depicted spooled around a reel 430. The reel 430 of tape 210' of shaped bodies 212 can be used in a number of applications including using the shaped bodies 212 as antenna carriers. Also within the scope of the invention is having a reel 430 of thermoformable tape 210' where the shaped bodies 212 have coupled components including but not limited to antenna radiators, electrical traces, electrical conductors, wires, active and passive electrical components, or a combination thereof.

In operation, a substantially flat tape 210 of a thermoformable material can be moved into a thermoforming device 220, 225. The thermoforming device 220, 225, utilizing heat and pressure, forms one or more shaped body from the tape. The shaped body can be used as an antenna carrier. After forming one or more shaped bodies 212, the tape is repositioned. Movement of the tape can be implemented by the used of a gear 230 that engages the tape along a plurality of apertures 215 formed in the tape. The shaped bodies 212 can be further processed by a manufacturing device 240 which can couple components such as an antenna radiator 219 FIG. 3 and thereby produce a modified shaped body 212'. The tape can be processed until a structure 300 comprising a tape 210' with a number of shape bodies 212 and modified shaped bodies 212' are produced. The structure of shaped bodies 300—FIG. 3 can be spooled onto a reel 410—FIG. 4. The reel of shaped bodies 400—FIG. 4 can be used by a pick and place assembly line in the production of devices such as cell phones.

What is claimed is:

1. A method of thermoforming shaped bodies from a thermoformable tape, the method comprising the steps:
   positioning a first area of thermoformable tape proximate to a thermoforming device;
   thermoforming the first area, thereby forming a first thermoformed shaped body coupled to the tape, wherein the first thermoformed shaped body is formed into an antenna carrier;
   repositioning the tape such that a second area of thermoformable tape is proximate to the thermoforming device;
   thermoforming the second area, thereby forming a second thermoformed shaped body coupled to the tape, wherein the second thermoformed shaped body is formed into an antenna carrier;
   coupling an antenna radiator to the first thermoformed shaped body while the first thermoformed shaped body is still attached to the thermoformable tape; and
   coupling an antenna radiator to the second thermoformed shaped body while the second thermoformed shaped body is still attached to the thermoformable tape.

2. The method of claim 1, wherein the positioning of the tape is provided by a mechanical means inducing a positioning force by means of at least one gear coupled to a plurality of apertures positioned substantially uniformly along the edge of the tape.

3. The method of claim 1, further comprising the step of configuring the first and second thermoformed shaped bodies to be readily removable from the tape.

4. The method of claim 3, wherein a boundary is formed between the tape and the shaped bodies, and wherein the step of configuring the first and second thermoformed shaped bodies to be readily removable from the tape is selected from at least one of scoring the tape, partially cutting the tape, or a combination thereof.

5. The method of claim 3, further comprising the step of removing at least one shaped body from the tape.

6. The method of claim 1, further comprising the step of spooling the tape with the first and second thermoformed shaped bodies on a reel.

7. The method of claim 1, further comprising the step of incorporating the tape of thermoformed shaped bodies into a manufacturing assembly line.

8. The method of claim 1, wherein the first thermoformed shaped body and the second thermoformed shaped body are configured to be used as subassemblies for the production of other electronic devices.

9. The method of claim 8, wherein the first thermoformed shaped body and the second thermoformed shaped body are configured to be used in cell phones.

10. The method of claim 6, further comprising the step of moving the reel.

11. A method of thermoforming shaped bodies from a thermoformable tape, the method comprising the steps:
    positioning a first area of thermoformable tape proximate to a thermoforming device;
    thermoforming the first area, thereby forming a first thermoformed shaped body coupled to the tape;
    repositioning the tape such that a second area of thermoformable tape is proximate to the thermoforming device;

thermoforming the second area, thereby forming a second thermoformed shaped body coupled to the tape, wherein the first thermoformed shaped body and the first thermoformed shaped body are differently shaped;

coupling an antenna radiator to the first thermoformed shaped body while the first thermoformed shaped body is still attached to the thermoformable tape; and coupling an antenna radiator to the second thermoformed shaped body while the second thermoformed shaped body is still attached to the thermoformable tape.

\* \* \* \* \*